United States Patent [19]

Meteyer et al.

[11] 4,184,019
[45] Jan. 15, 1980

[54] OXIDATIVELY STABLE ION EXCHANGE RESIN CONDENSATION PRODUCT OF AN EPICHLOROHYDRIN AND A POLYAMINE

[75] Inventors: Thomas E. Meteyer, Ambler; William Fries, Southhampton, both of Pa.

[73] Assignee: Rohm and Haas Company, Philadelphia, Pa.

[21] Appl. No.: 897,989

[22] Filed: Apr. 20, 1978

[51] Int. Cl.² .................. C08G 73/02; C08G 2/30; B01D 15/04
[52] U.S. Cl. .................................... 521/34; 525/403
[58] Field of Search ............ 260/2 BP, 2.1 R, 2.2 R; 521/34; 528/404

[56] References Cited

U.S. PATENT DOCUMENTS

| | | | |
|---|---|---|---|
| 2,898,309 | 8/1959 | Greer | 26/2 BP |
| 2,898,310 | 8/1959 | Greer | 260/2 BP |
| 3,661,821 | 5/1972 | Caldo et al. | 260/2 BP |
| 3,725,312 | 4/1973 | Panzer et al. | 260/2 BP |
| 3,784,489 | 6/1974 | Dales et al. | 260/2.1 R |

FOREIGN PATENT DOCUMENTS 1083681 9/1967 United Kingdom ................. 260/2 BP

*Primary Examiner*—Joseph L. Schofer
*Assistant Examiner*—Peter F. Kulkosky
*Attorney, Agent, or Firm*—Jordan J. Driks

[57] ABSTRACT

An ion exchange resin composition which comprises the reaction product of an epihalohydrin with a polyamine is alkylated. The polyamine has a molecular weight of from about 60 to about 298. This invention also encompasses a process for preparing the ion exchange resin composition which comprises reacting from about two-thirds of a stoichiometric amount of epihalohydrin to one and one-half times the stoichiometric amount of epihalohydrin with defined polyamines and thereafter reacting the resultant polymer with an alkylating agent to yield the final product.

9 Claims, No Drawings

OXIDATIVELY STABLE ION EXCHANGE RESIN CONDENSATION PRODUCT OF AN EPICHLOROHYDRIN AND A POLYAMINE

BACKGROUND OF THE INVENTION

U.S. Pat. No. 3,784,489 discloses an ion exchange resin which is the condensation product of a dihaloalkane with a polyethylene amine. Thereafter, this patent discloses methylating the non-tertiary amine groups of the condensation product to convert these groups of tertiary or quaternary amines. The patent also discloses that the polyethylene amine used must be one which has a molecular weight of from 300 to 60,000. It is believed that this description concerning the molecular weight of the polyethylene amine, exists because, if the polyamine has a molecular weight below 300, then the condensation product of the dihaloalkane and the polyethylene amine tends to be too soft and deformable for use as an ion exchange resin.

Another class of materials which may be used to prepare an ion exchange resin is the condensation product of the epihalohydrins with a polyamine. When an epihalohydrin-polyamine condensation product is used as an ion exchange resin, such an ion exchange resin has been found to suffer from a lack of oxidative stability which severely limits the use of such resin in commercial ion exchange applications.

It is generally believed that the presence of secondary hydroxyl groups on a polymer which is to be used as an ion exchange resin renders the ion exchange resin susceptible to oxidative instability during normal use and results in subsequent poor performance of the resin. Therefore, the presence of secondary hydroxyl groups on a polymer used as an ion exchange resin has usually been provided.

Oxidative instability results in a physical breakdown of the resin particles during use, so that such resin particles will commonly shatter when used as normally intended. In addition, such oxidative instability results in a resin which requires excessive amounts of regenerating material to regenerate the column due to the fact that the oxidized resins have reduced ion exchange properties.

In accordance with the present invention, it has now been found that when an epihalohydrin is reacted with a polyamine, which polyamine has a molecular weight of from about 60 to about 298, and thereafter the primary or secondary amine groups are alkylated to convert such groups to tertiary or quaternary amines, the resultant alkylated polymer is not only satisfactory for use as an ion exchange resin, but exhibits enhanced oxidative stability beyond that which would be normally expected.

Because the alkylated polymers of this invention all contain secondary hydroxyl groups, it was surprising to find that ion exchange resins comprising such polymers were not oxidatively unstable but actually exhibited enhanced oxidative stability.

It is an object of this invention, therefore, to provide an ion exchange resin having good oxidative stability from an epihalohydrin-polyamine condensation product.

A further object of this invention is to produce such a resin from a polyamine having a molecular weight of from about 60 to about 298.

A still further object of this invention is to provide a process for producing an ion exchange resin which has good oxidative stability.

Other objects and advantages will become apparent from the following more complete description and claims.

DESCRIPTION OF THE INVENTION

An epihalohydrin, such as epichlorohydrin, is added to a solvent and a suspending agent is added thereto. The mixture is heated to a temperature of from about 25° C. to about 100° C. and a polyamine, such as triethylenetetramine and water, is added dropwise over a period of time while maintaining the temperature of the mixture at from about 25° C. to about 100° C. After the addition of the polyamine is completed, if desired, the mixture may be kept at a temperature of from about 25° C. to about 100° C. for up to about 4 hours and then heated to reflux. Thereafter, the mixture is held at reflux for a period of time of from about 3 hours to about 12 hours to complete the reaction of polyamine with epihalohydrin. After the reflux period is complete, the solvents are removed and water is added to maintain a liquid level. It is at this stage, as a result of the reaction of the polyamine with the epihalohydrin, that secondary hydroxyl groups have been introduced into the polymer back bone.

The reaction product is then cooled and is alkylated, using an alkylating agent such as formaldehyde and formic acid. During the alkylation, the temperature is maintained at from about 25° C. to about 95° C. After the addition is complete, the temperature of the slurry is kept between from about 25° C. to about 100° C. for a period of from about 1 hour to about 8 hours. The mixture is then held at a temperature of from about 90° C. to about 100° C. for about 2 hours and is then cooled, and washed with water. The product is now suitable for use in an ion exchange column.

The epihalohydrin used may be any one of the epihalohydrins such as epichlorohydrin, epibromohydrin, epifluorohydrin, or epiiodohydrin. It is preferred, however, that epichlorohydrin be used because excellent results have thereby been obtained.

Any polyamine may be used which has a molecular weight of from about 60 to about 298 and which conforms to the general formula:

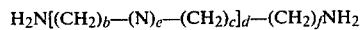

$$H_2N[(CH_2)_b-(N)_e-(CH_2)_c]_d-(CH_2)_fNH_2$$

wherein b is a number from 0 to 16, c is a number from 0 to 16, the sum of b plus c being 0 to 16, d is from 0 to 5, the sum of b plus c plus d being from 0 to 14, f is from 2 to 3, e is from 0 to 1, and when b is 0, e is 0. In order for a polyamine to be useful in practicing this invention, it must conform to the general formula given above and have a molecular weight of from about 60 to about 298. Although e will always be 0 when b is 0, e may be from 0 to 1 when c is 0.

Among the polyamines which may be used are triethylenetetramine, pentaethylenehexamine, ethylene diamine, aminopropylethylenediamine, bisaminopropylethylenediamine, diethylene triamine, hexadecyldiamine, iminobisoctylamine, and the like.

It is particularly preferred to use, as the polyamine, triethylenetetramine because excellent results have been obtained.

When reacting the epihalohydrin, such as epichlorohydrin, with a polyamine, such as triethylenetetramine, it is important that the epihalohydrin be used in an amount of from about ⅔ the stoichiometric amount of about 1½ times the stoichiometric amount. If less than ⅔ the stoichiometric amount is used, then the final ion exchange resin tends to be too weak for commercial use. If, however, more than 1½ times the stoichiometric amount of epihalohydrin to polyamine is used then the final ion exchange resin tends to be too heavily cross-linked and breaks or shatters too easily. In addition, such an ion exchange resin prepared with more than 1½ times the stoichiometric amount of epihalohydrin to polyamine, would exchange ions too slowly for commercial use and would tend to break upon regeneration of the resin in the column.

The proper amount of epihalohydrin to polyamine can readily be calculated by one skilled in the art. Each polyamine hydrogen which is connected to a nitrogen can theoretically react with ½ mole of an epihalohydrin.

The epihalohydrin-polyamine condensation products may be prepared by dissolving the epihalohydrin in an organic solvent which is inert to the reactants and in which the polyamine is insoluble.

A suspending agent is generally added to the solvent, prior to addition of the polyamine, in order to keep the aqueous polyamine solution in suspension when such polyamine solution is added to the epihalohydrin solution.

The amount of solvent used for the epihalohydrin is not critical so long as sufficient solvent is used to keep the polyamine, which is subsequently added, in suspension. Any suitable organic solvent which will not dissolve the polyamine and which is inert to the reactants, may be used. Among the solvents which may be used are chlorobenzene, orthodichlorobenzene, propylene dichloride, ethylene dichloride, benzene, and the like. The choice of solvent is usually dictated by economic considerations and those considerations set forth above.

Any suitable suspending agent may be used which is able to maintain droplets of the aqueous polyamine solution in suspension and which will prevent the amine from dissolving in the system. Among the suspending agents which may be used are an oil solution of polybutenylsuccinimide polyamine, a maleic anhydride adduct of polyisobutylene which is further reacted with N-hydroxyethyl morpholine and preferably any inert, oil soluble suspending agent and the like.

The polyamine is added to the epihalohydrin solution as an aqueous solution. The polyamine should be dissolved in a sufficient amount of water to prevent the polyamine from dissolving in the organic solvent. If too much water is used, then the resultant epihalohydrin-polyamine reaction product will be granular in nature and will not be commercially useful. In addition, such epihalohydrin-polyamine reaction product will be too fragile during chemical regeneration to be useful as an ion exchange resin.

Generally speaking, the amounts of water used for the aqueous polyamine will vary from about 30% to about 60% of water based on the weight of the polyamine. The preferred amount of water will vary within the aforesaid range and is dependent upon the ratio used of epihalohydrin to polyamine.

The hydrated amine is added to the epihalohydrin solution dropwise. The condensation reaction between the polyamine and the epihalohydrin is an exothermic reaction so that the polyamine is added dropwise at room temperature. In a preferred method, the reaction is heated to a temperature of from about 25° C. to about 50° C. for about 60 minutes and thereafter, the reaction mixture is kept at a temperature of from about 40° C. to about 50° C. for about 60 minutes and then heated to reflux and maintained at reflux in order to complete the reaction. Preferably, the reflux will continue for a period of about 6 hours to about 8 hours to assure that the reaction has gone to completion.

After the reaction has been completed, organic solvent is removed and water is added in order to maintain a fluid slurry. The amount of water added is not critical so long as sufficient water is added to maintain a fluid slurry.

This fluid slurry is then cooled and organic solvent is siphoned from the slurry.

The resultant epihalohydrin-polyamine condensation product is then alkylated to improve the oxidative stability of the product.

The alkylation may be of two types. The condensation product may be reductively alkylated using formaldehyde and formic acid or it may be exhaustively alkylated using a suitable alkylating agent such as an alkyl halide, for example, methyl, ethyl and propyl chlorides, bromides and iodides; unsaturated alkylating agents such as allyl chloride, bromide or iodide and the like; and aromatic alkylating agents such as a benzyl halide, e.g., benzyl chloride, bromide or iodide and the like. Other exhaustive alkylating agents such as alkyl sulfates, alkylene oxides and the like may also be used. In addition, an epihalohydrin such as epichlorohydrin may also be used as an alkylating agent.

It is preferred, however, to use reductive alkylation using formaldehyde and formic acid because excellent results have been thereby obtained.

If reductive alkylation is to be used, such reaction is generally carried out at a temperature of from about 25° to about 100° C. and preferably from about 55° to about 90° C. Alkylation, in the reductive manner, is carried out by adding, for example, formaldehyde to the aqueous slurry of the epihalohydrin-polyamine condensation product and allowing a period of from about ½ to about 2 hours for the formaldehyde to react with the condensation product. Thereafter, formic acid is then added to the reaction mixture.

The amounts of formaldehyde and formic acid used will generally be about 2 moles of formaldehyde and 2 moles of formic acid for each primary or secondary amine in the condensation product. After the formic acid has been added, the slurry will generally be heated within the aforesaid temperature range for from about 4 to about 14 hours to assure that alkylation is complete.

If exhaustive alkylation is to be employed, then the alkylating agent is added to an aqueous slurry of the condensation product and heating is commenced at a temperature of from about 20° C. to about 125° C. If exhaustive alkylation is to be utilized, then a basic catalyst may be utilized to promote the reaction.

Whether exhaustive alkylation or reductive alkylation is used, a molar excess of the alkylating agent should be utilized in order to assure complete conversion of all primary and secondary amine groups to the tertiary or quaternary form.

After alkylation is completed, the resin is removed from the reaction vessel, washed and dried and is now suitable for packing in an ion exchange column.

In order to more fully illustrate the nature of this invention and the manner of practicing the same, the following examples are presented.

EXAMPLE 1

207 grams of epichlorohydrin, 1,004 grams of chlorobenzene and 5.2 grams of an oil solution of polybutenylsuccinimide polyamines are charged to a 3 neck, 2 liter, round bottom flask equipped with a stirrer and the mixture is stirred. While stirring the mixture, 109.5 grams of triethylenetetramine and 185.5 grams of water are added to the reaction vessel over a period of 30 minutes. The reaction mixture is heated to a temperature of 35° C. whereupon the exothermic nature of the reaction raises the temperature to 50° C. The reaction mixture is then maintained at a temperature of from 50° to 60° C. for 45 minutes and is then heated to reflux. The reaction mixture is then refluxed for 8 hours. Reflux is then discontinued and the polymer dispersion is cooled, removed and washed. Prior to alkylating the polymer, the non-alkylated polymer has the following properties.

% Solids = 35.0
Anion Exchange Capacity = 10.7 meq./gram
Carboxyl Exchange Capacity = 0.0 meq./gram
Rinse Requirement = 61 gallons/cu. ft.

A sample of the non-alkylated polymer is removed for use in accelerated oxidative stability tests described later.

The remainder of the polymer (131.0 grams) is added to a 3 neck, 2 liter flask equipped with a stirrer and containing 100 grams of water. The mixture is stirred and 110 grams of a 37% formaldehyde solution is added to the mixture over a period of 45 minutes. The reaction mixture is heated to 35° C. and 78 grams of an 88% formic acid solution is added over a period of 45 minutes while maintaining the temperature of the reaction mixture of 35°. After the addition of formic acid is completed, the reaction mixture is heated to 60° C. and maintained at that temperature for 12 hours. Heating is then discontinued, the reaction slurry is then cooled and the alkylated polymer is removed and washed with 1 liter of water.

The alkylated polymer has the following properties.
% Solids = 31.4
Anion Exchange Capacity = 9.8 meq./gram
Carboxyl Exchange Capacity = 0.09 meq./gram
Rinse Requirement = 41 gallons/cu. ft.

Oxidative Stability Test

The accelerated oxidative stability test procedure used consists of making a slurry of 25 grams of the resin, 512 grams of water and 2 grams of $CuSO_4 \cdot 5H_2O$. To this slurry is added 128 milliliters of 30% hydrogen peroxide. The slurry is stirred for 5 minutes at room temperature and the percent solids remaining is determined. This is then compared with the percent solids of the resin prior to the oxidative stability test.

Both the non-alkylated and the alkylated resin are subjected to the oxidative stability test described above. The results are as follows:

| Sample | % Solids Before Oxidative Stability Test | % Solids After Oxidative Stability Test | Difference in Percentages |
|---|---|---|---|
| Non-alkylated Example 1 | 35 | 28 | 7 |
| Alkylated Example 1 | 31.4 | 30.1 | 1.3 |

The above oxidative stability tests demonstrate that, despite the presence of secondary hydroxyl groups on the polymer resin, an alkylated polymer resin is much more oxidatively stable than a non-alkylated polymer resin.

EXAMPLE 2

The procedure of Example 1 for the preparation of the non-alkylated polymer resin is repeated except that 192 grams of epichlorohydrin, 146 grams of triethylenetetramine, 198.5 grams of water and 1,100 grams of chlorobenzene are used. The resultant non-alkylated polymer resin has a solids content of 33.4%. A sample of this non-alkylated polymer resin is reserved for oxidative stability test comparisons and the remainder is alkylated in the following manner.

To a 3 neck, 2 liter flask equipped with a stirrer and containing 200 grams of water, is added 225 grams of the polymer resin of this example while stirring. Formaldehyde, 188.9 grams of a 37% solution, is added to the slurry over a 45 minute period while heating the reaction to a temperature of 35° C. Formic acid, 132.6 grams of an 88% solution, is then added over a 45 period while maintaining the reaction mixture at the aforesaid temperature of 35° C. After the completion of the addition of formic acid, the slurry is then heated to 75° C. over a period of 3 hours and is then maintained at 75° C. for an additional 12 hours. Heating is then discontinued and the product is removed and washed with 2 liters of water.

The oxidative stability test procedure set forth in Example 1 is utilized for determining the oxidative stability of both the non-alkylated and the alkylated samples. The results are as follows:

| Sample | % Solids Before Oxidative Stability Test | % Solids After Oxidative Stability Test | Difference in Percentages |
|---|---|---|---|
| Non-alkylated Example 2 | 33.4 | 26 | 7.4 |
| Alkylated Example 2 | 31.4 | 28 | 3.4 |

EXAMPLE 3

The procedure of Example 1 is repeated except that 94 grams of tetraethylpentamine and 116 grams of water are reacted with 176.8 grams of epibromohydrin in 400 grams of chlorobenzene. Alkylation is accomplished in the manner of Example 1. A polymer resin suitable for use as an ion exchange resin is obtained.

EXAMPLE 4

The procedure of Example 1 is repeated except that 40 grams of ethylene diamine and 117.8 grams of water are reacted with 235 grams of epibromohydrin in 400 grams of chlorobenzene. Alkylation is accomplished in the manner of Example 1. A polymer resin suitable for use as an ion exchange resin is obtained.

EXAMPLE 5

The procedure of Example 1 is repeated except that 117 grams of aminopropylethylene diamine and 134.8 grams of water are reacted with 197.6 grams of epichlorohydrin in 600 grams of chlorobenzene. Alkylation is accomplished in the manner of Example 1. A suitable ion exchange resin is obtained.

EXAMPLE 6

The purpose of Example 6 is to illustrate the results of substituting a dihalide for the epihalohydrin which is part of this invention.

To a 3 neck, 2 liter, round bottom flask equipped with a stirrer is added 100 grams of tetraethylene pentamine and 36.8 grams of propylene dichloride. The reaction mixture is heated to 90° C. and is held at this temperature for 6 hours. The reaction mixture is then cooled and the product is removed. A taffy-like polymer is isolated. This material is soluble in water and is unsuitable for use as an ion exchange resin and oxidative stability tests could not be determined because of the physical nature of this polymer.

In a separate preparation, performed in the manner set forth above, 215 grams of triethylenetetramine and 560 grams of propylene dichloride are mixed in the presence of 71 grams of water. 2 grams of a sodium iodide catalyst and 1.3 grams of a suspending agent are added to the reaction mixture. The mixture is then poured into a pressure reactor and stirred and heated to 120° C. for 8 hours. The resultant polymer is cooled and an amorphous sticky material is obtained which is unsuitable for use as an ion exchange resin. Because of the physical nature of this material, it is not possible to perform oxidative stability tests.

While this invention has been described in terms of certain preferred embodiments and illustrated by means of specific examples, the invention is not to be construed as limited except as set forth in the following claims.

What is claimed is:

1. A weakly basic ion exchange resin comprising a polymer containing secondary hydroxyl groups, said polymer being a condensation product of an epihalohydrin and a polyamine, which polymer contains tertiary amine groups resulting from the reaction of said condensation product with formaldehyde and thereafter with formic acid, said polyamine having the general formula:

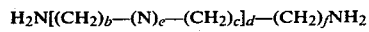

wherein b is a number from 0 to 16, c is a number from 0 to 16, the sum of b plus c being 0 to 16, d is from 0 to 5, the sum of b plus c plus d being from 0 to 14, f is from 2 to 3, e is from 0 to 1, and when b is 0, e is 0 said polyamine having a molecular weight of from about 60 to about 298.

2. An ion exchange resin according to claim 1 wherein said alkylated amine is a methylated amine.

3. An ion exchange resin according to claim 1 wherein said polyamine is triethylenetetramine.

4. An ion exchange resin according to claim 1 wherein said polyamine is diethylenetriamine.

5. An ion exchange resin according to claim 1 wherein said epihalohydrin is epichlorohydrin.

6. A process for preparing an epihalohydrin polyamine polymer having tertiary amine groups and suitable for use as a weakly basic ion exchange resin comprising the steps of (a) reacting from about two-thirds of a stoichiometric amount of an epihalohydrin to about one and one-half times the stoichiometric amount of said epihalohydrin with a polyamine having the formula:

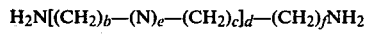

wherein b is a number from 0 to 16, c is a number from 0 to 16, the sum of b plus c being 0 to 16, d is from 0 to 5, the sum of b plus c plus d being from 0 to 14, f is from 2 to 3, e is from 0 to 1, and when b is 0, e is 0 said polyamine having a molecular weight of from about 60 to about 298, (b) reacting the product of (a) with formaldehyde and thereafter with formic acid thereby converting primary and secondary amine groups to tertiary amine groups.

7. A process according to claim 6 wherein said epihalohydrin is epichlorohydrin.

8. A process according to claim 6 wherein said polyamine is triethylenetetramine.

9. A process according to claim 6 wherein said polyamine is diethylenetriamine.

* * * * *

UNITED STATES PATENT AND TRADEMARK OFFICE
CERTIFICATE OF CORRECTION

PATENT NO. : 4,184,019

DATED : January 15, 1980

INVENTOR(S) : Thomas E. Meteyer et al

It is certified that error appears in the above-identified patent and that said Letters Patent are hereby corrected as shown below:

Column 1, line 37, last word in paragraph "provided" should be --avoided--

Column 6, line 24, added over a "45 period" should be --45 minute period--

Signed and Sealed this

Fourth Day of November 1980

[SEAL]

Attest:

SIDNEY A. DIAMOND

Attesting Officer

Commissioner of Patents and Trademarks